United States Patent
Straeter

(10) Patent No.: US 8,087,223 B2
(45) Date of Patent: Jan. 3, 2012

(54) CHOPPER ASSEMBLY FOR A HARVESTING IMPLEMENT

(76) Inventor: James E. Straeter, Rochester, IN (US)

( * ) Notice: Subject to any disclaimer, the term of this patent is extended or adjusted under 35 U.S.C. 154(b) by 0 days.

(21) Appl. No.: 12/868,985

(22) Filed: Aug. 26, 2010

(65) Prior Publication Data

US 2010/0313539 A1 Dec. 16, 2010

Related U.S. Application Data

(63) Continuation-in-part of application No. 12/420,494, filed on Apr. 8, 2009, now Pat. No. 7,856,800.

(51) Int. Cl.
*A01D 45/02* (2006.01)

(52) U.S. Cl. .................. 56/60; 56/500; 56/503

(58) Field of Classification Search ............. 56/60, 61, 56/500, 503–505
See application file for complete search history.

(56) References Cited

U.S. PATENT DOCUMENTS

| | | | |
|---|---|---|---|
| 2,484,802 A * | 10/1949 | Aasland | 56/104 |
| 2,527,786 A * | 10/1950 | Barkstrom | 56/66 |
| 2,634,569 A | 4/1953 | Russell et al. | |
| 2,877,616 A | 3/1959 | Gewalt et al. | |
| 2,952,109 A * | 9/1960 | Lambert | 56/13.6 |
| 3,208,206 A | 9/1965 | Lundell | |
| 3,583,134 A * | 6/1971 | Kemper et al. | 56/13.3 |
| 3,599,404 A | 8/1971 | Fernandez et al. | |
| 3,680,291 A | 8/1972 | Soteropulos | |
| 3,762,137 A * | 10/1973 | Veretto | 56/13.3 |
| 3,984,966 A * | 10/1976 | Outtier | 56/10.2 R |
| 4,083,167 A | 4/1978 | Lindblom et al. | |
| 4,148,175 A | 4/1979 | Miller | |
| 4,182,098 A | 1/1980 | Kass | |
| 4,251,980 A | 2/1981 | Miller | |
| 4,373,536 A | 2/1983 | da Silva | |
| 4,510,948 A | 4/1985 | Dekeyzer | |
| 4,581,878 A | 4/1986 | Vida et al. | |
| 4,594,842 A | 6/1986 | Wolters et al. | |
| 4,622,804 A | 11/1986 | Krone et al. | |
| 4,691,505 A | 9/1987 | Browne | |
| 4,926,623 A | 5/1990 | Fiener | |
| 5,052,170 A | 10/1991 | Trenkamp et al. | |
| 5,330,114 A | 7/1994 | Trenkamp et al. | |
| 5,875,622 A | 3/1999 | Stoll | |
| 6,073,429 A | 6/2000 | Wuebbels et al. | |
| 6,412,259 B1 | 7/2002 | Wiegert | |
| 7,047,717 B1 | 5/2006 | Wolters et al. | |
| 7,063,614 B2 | 6/2006 | Vogelgesang et al. | |
| 7,297,053 B2 * | 11/2007 | Farley | 460/112 |
| 2007/0037621 A1 | 2/2007 | Isfort | |

* cited by examiner

*Primary Examiner* — Alicia Torres

(57) ABSTRACT

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

9 Claims, 5 Drawing Sheets

CHOPPER ASSEMBLY FOR A HARVESTING IMPLEMENT

CROSS REFERENCE TO A RELATED APPLICATION

This application is a continuation-in-part of U.S. patent application Ser. No. 12/420,494 filed Apr. 8, 2009.

FIELD OF THE INVENTION

This invention relates to a chopper assembly. More particularly, this invention relates to a chopper assembly for a harvesting implement.

BACKGROUND OF THE INVENTION

Harvesting corn is well known in the art. Conventionally, corn pickers remove the ears from the stalks and process those ears on through the machine, while leaving the stalks flattened against the ground and secured to their root structure. The stalks left in this condition are difficult to pick up and utilize for corn fodder, silage or biomass. To improve upon this, devices have been developed that not only remove the ears of corn from the stalks, but also cut the stalks and put them into a windrow whereupon they can be easily picked up and utilized as desired, such as by being processed through a chopping machine.

While these devices have provided some improvement in the art, there are still deficiencies preventing commercial adoption. To begin, these devices require many moving parts, are complex to manufacture, and are susceptible to wear. In addition, the devices are built into the machine and therefore are difficult to remove and repair. Finally, because these devices are built into the machines they are not adaptable for use on different corn heads for desired applications. Accordingly, there exists a need in the art for a device that addresses these deficiencies.

Therefore, an object of the present invention is to provide a chopping assembly for a harvesting implement that has fewer moving parts.

Another objective is to provide a dedicated chopper/transport assembly for each individual row without impacting adjacent rows.

Yet another object of the present invention is to provide a chopping device for a harvesting implement that is removable.

A still further object of the present invention is to provide a chopping assembly for a harvesting implement that is adaptable to different sized corn headers.

These and other objects, features, or advantages of the present invention will become apparent from the specification and claims.

SUMMARY OF THE INVENTION

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

DETAILED DESCRIPTION OF THE PREFERRED EMBODIMENT

Figure 1:
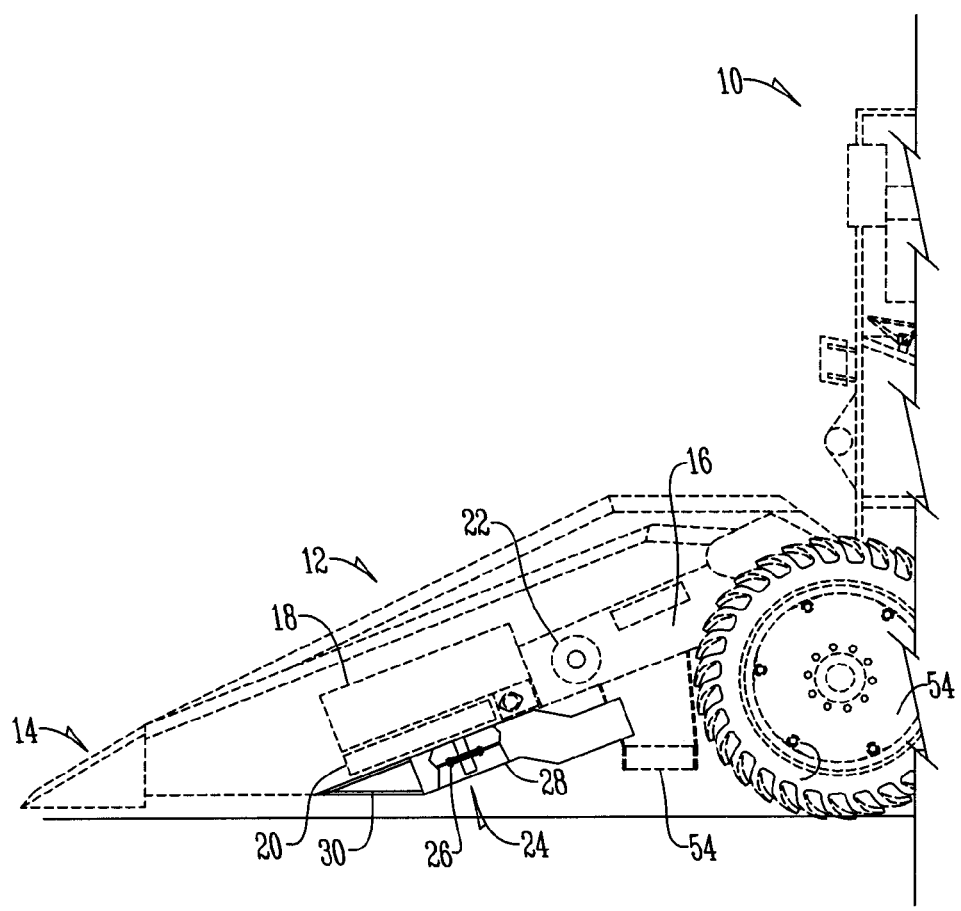
FIG. 1 is a side elevational view of a combine having a corn head with an attached chopper assembly.
Figure 2:
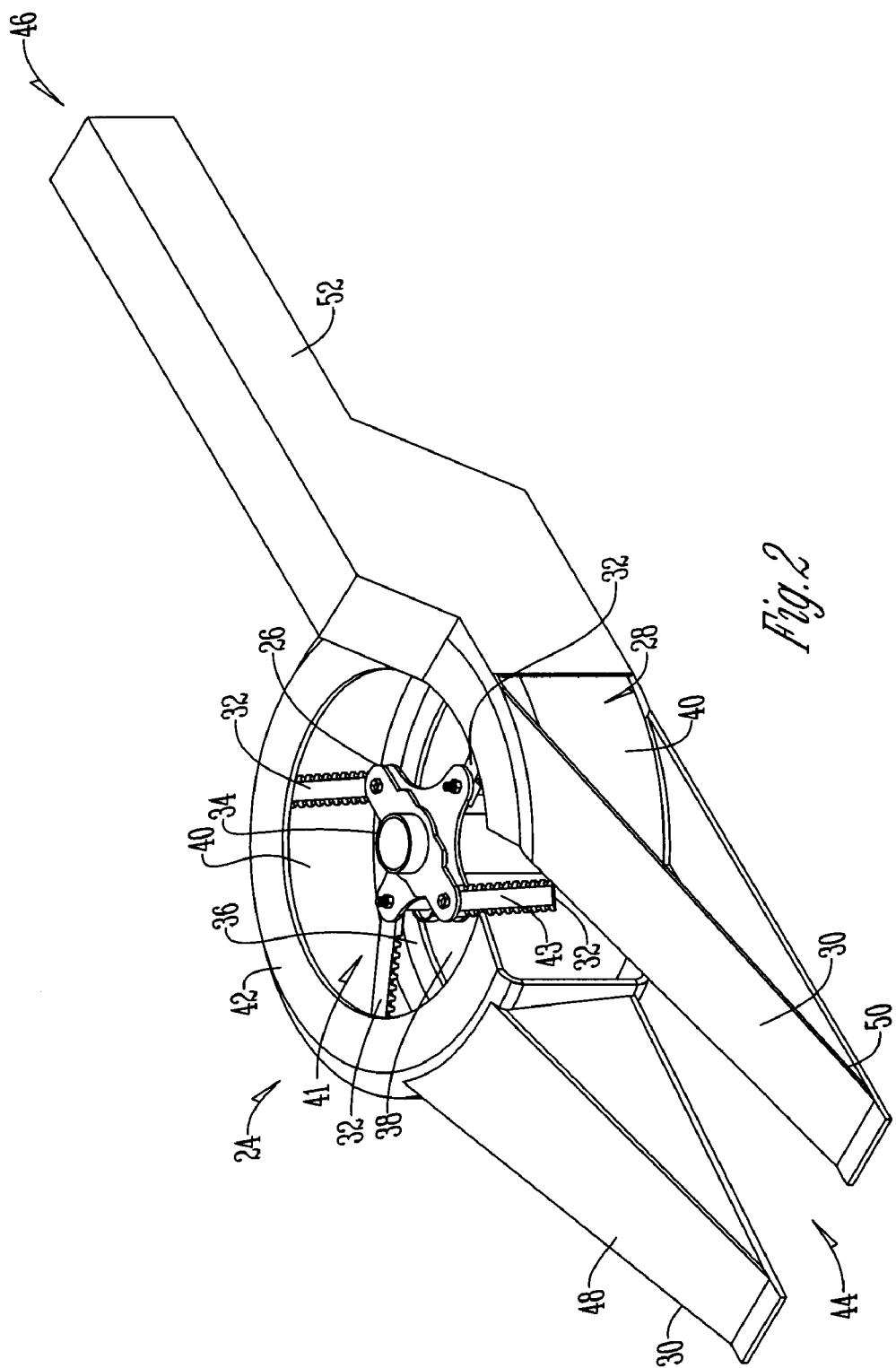
FIG. 2 is a bottom perspective view of a chopper assembly.
Figure 3:
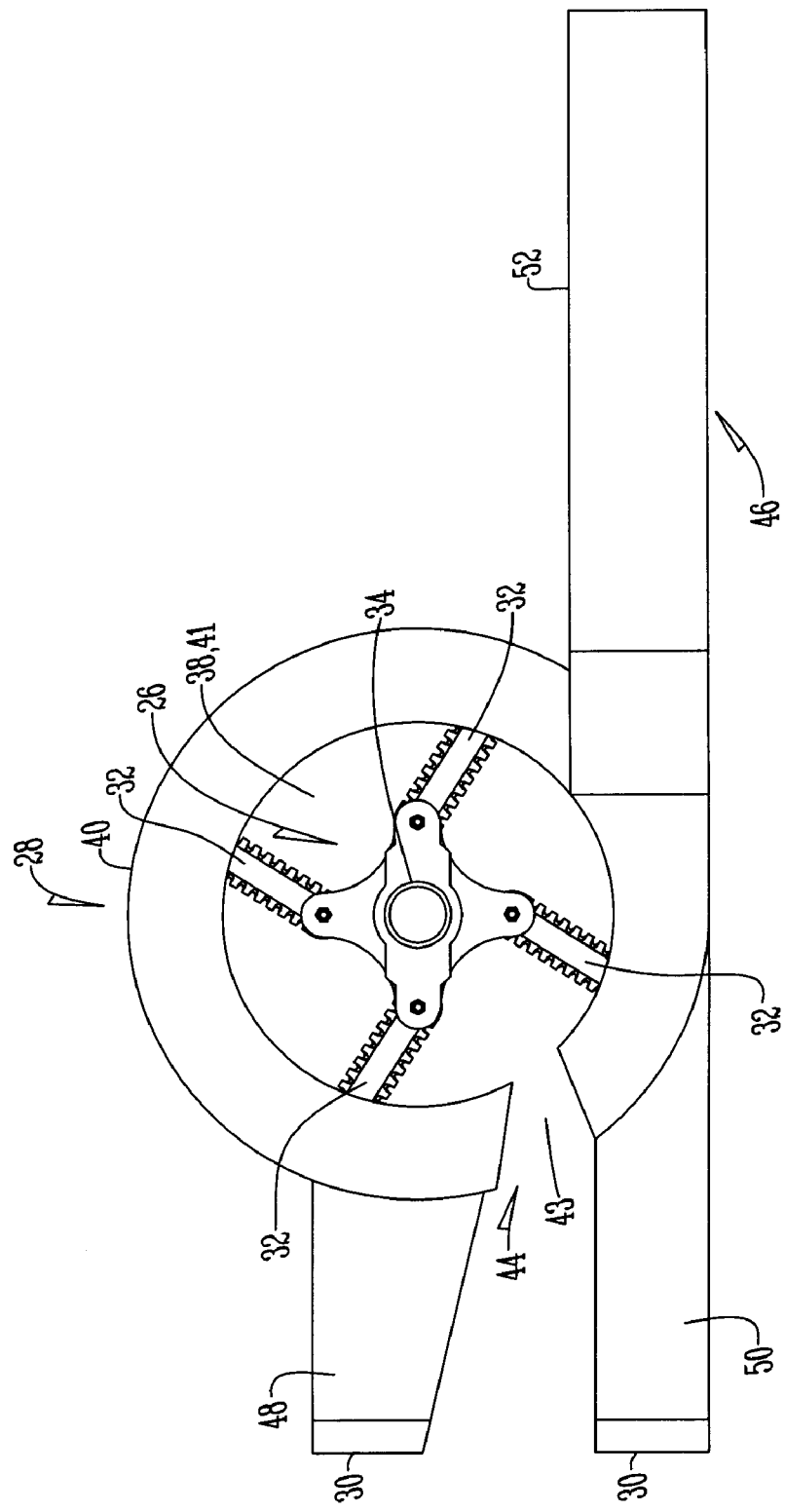
FIG. 3 is a bottom elevational view of a chopper assembly.
Figure 4:
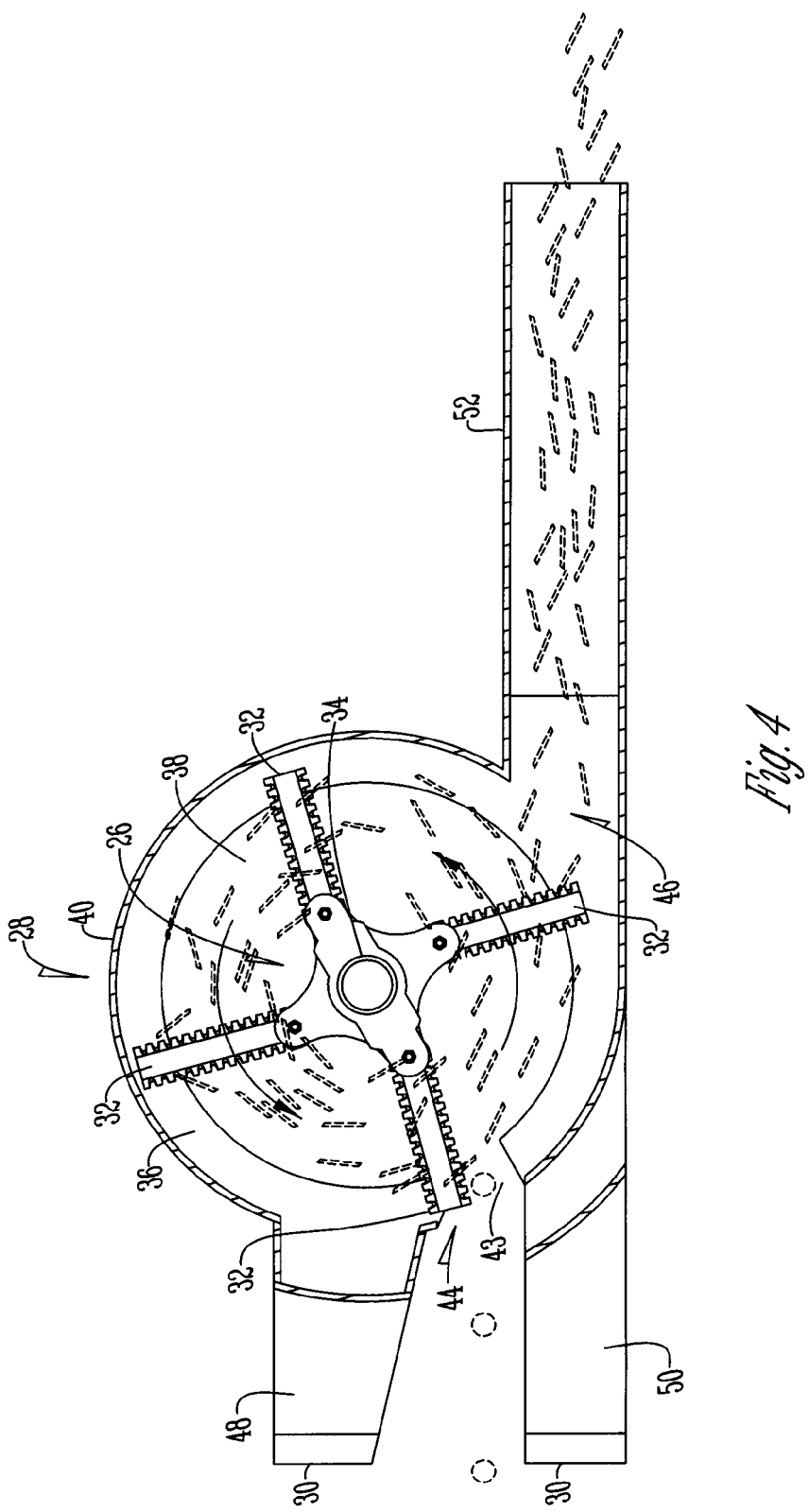
FIG. 4 is a bottom sectional view of a chopper assembly.
Figure 5:
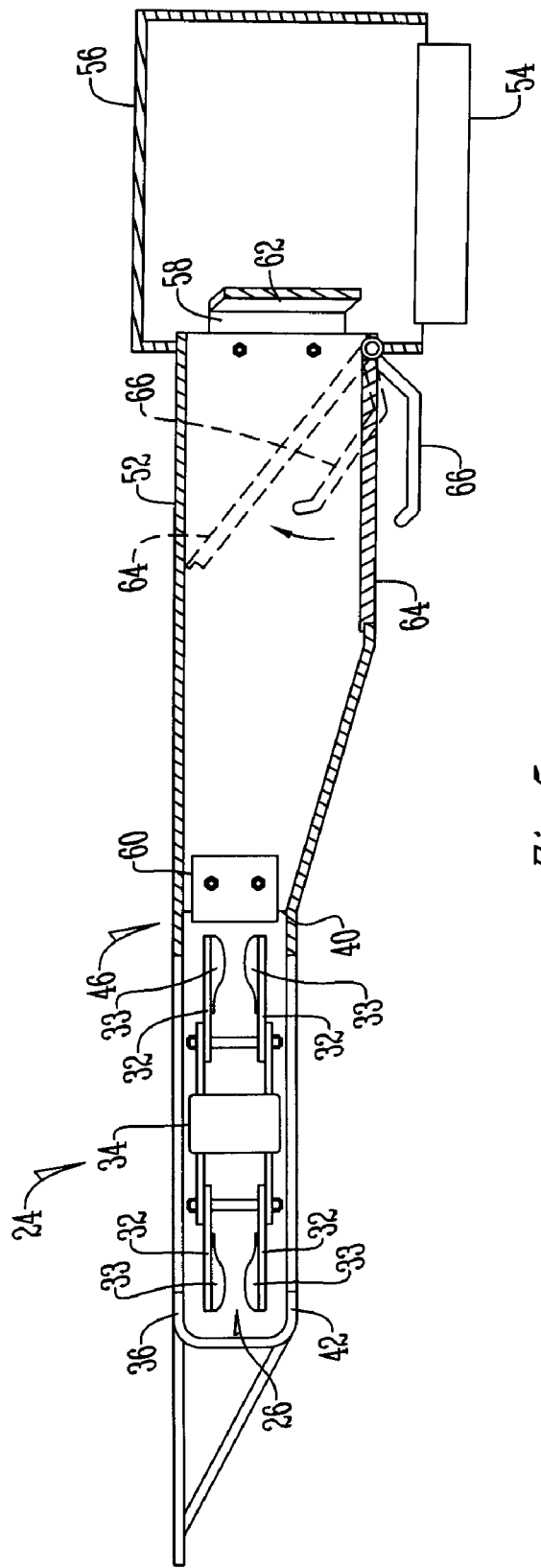
FIG. 5 is a side view in partial cross section of a chopper assembly.

With reference to the figures, a harvesting implement 10, such as a combine, has a corn head 12 carried by the combine. The corn head 12 has a plurality of gathering shoes 14 and a frame 16. Positioned between each pair of adjacent gathering shoes 14 is a picking assembly 18 which has stalk rolls 20 that interact with the cornstalks and ears of corn, and an auger 22 positioned behind the picking assembly 18 to direct the picked corn to a desired location.

The chopping assembly 24 is positioned below and mounted to the corn head 12. The chopping assembly 24 includes a blade assembly 26, a housing 28, and a chopper guide 30. The blade assembly 26 includes a plurality of blades 32 that are attached to and extended outwardly from a drive shaft 34. In one embodiment, the blades 32 lie in more than one generally horizontal plane in relation to the drive shaft 34. Preferably, each blade 32 has a wing 33 and a sharp cutting edge on both sides making the blades reversible. The drive shaft 34 is connected to a source of power (not shown).

Surrounding the blade assembly 26 is a housing 28. The housing 28 has a top wall 36 connected to the corn head frame 16 with an opening 38 through which the drive shaft 34 extends, an arcuate side wall 40 and a bottom wall 42 having an opening 41 and a slot 43. The side wall 40 has an input port 44 and an output port 46.

The chopper guide 30 includes two elongated members 48, 50. The elongated members 48, 50 are mounted in spaced angled relation to the bottom of the corn head 12 at one end and the bottom of the housing 28 at the opposite end. The angle of the elongated members 48, 50 tapers downwardly and inwardly from the corn head 12 to the housing 28.

Mounted to and in communication with the output port 46 is an outwardly extending exhaust channel or conduit 52. The exhaust channel 52 is adjacent to a conveyor 54 at the end remote from the exhaust port 46.

The conveyor 54 has a removable cover 56 that allows for easy access to the conveyor 54 to unplug or service the conveyor 54. Within the conveyor 54, on the side walls of the cover 56 are guides 58 that direct material on the conveyor 54.

Located at the entrance of the exhaust channel 52 is an adjustable shear plate 60 that is connected to the exhaust channel 52. The adjustable shear plate 60 allows one to adjust the clearance between housing 28 and the exhaust channel 52 to protect and prevent wear of the channel 52. At the opposite end of the channel 52 is a deflector 62 that guides the material toward the center of the combine as material leaves the channel 52. In one embodiment, the walls of the channel 52 are tapered such that the cross section is increasing as material moves toward the discharge end.

In an additional embodiment the channel 52 has a door 64 that is part of the bottom wall of the channel 52. In a normal position, the door 64 lies parallel to the bottom wall. The door is opened by a handle 66 which permits material to fall to the ground when desired.

In operation, as the harvesting implement moves forward cornstalks are directed toward the picking assembly 18 by the gathering shoes 14. The picking assembly 18 engages the cornstalk with the stalk rolls 20 to separate the ear of corn from the stalk. The ear of corn is then transported by the auger 22 to its desired location.

As the picking assembly 18 is engaging the stalk to separate the ear of corn from the stalk, the stalk is captured by the elongated guide members 48 and 50 and directed toward the input port 44 of housing 28. As the stalk enters the input port 44 and is captured in the slot 43, the blades 32, which are rotated by drive shaft 34, cut the stalk from its roots and further cuts the stalk into stover. Also, debris from the picking assembly 18 falls through the opening 38 in the top wall 36 and is added to the stover. The rotation of the blades 32 creates a fluid dynamic force that blows the stover, with assistance of the housing 28, out of the output port 46, through the exhaust channel 52 to the conveyor 54. The conveyor 54 transports the stover to a windrow position.

What is claimed is:

1. A chopping assembly for a farm implement, comprising:
   a corn head mounted to a frame;
   a housing mounted to the corn head and having an input port and an output port in a side wall of the housing;
   a blade assembly disposed at least partially within the housing;
   an exhaust channel mounted to and extending outwardly from the housing wherein the exhaust channel has an exhaust channel entrance mounted to and in communication with the output port of the housing; and
   an adjustable shear plate mounted to a wall of the exhaust channel at the entrance of the exhaust channel adjacent the output port such that adjustment of the shear plate adjusts a clearance between the side wall of the housing and the exhaust channel.

2. The assembly of claim 1 wherein walls of the exhaust channel are tapered such that a cross section of the exhaust channel increases as material moves toward a discharge end wherein the discharge end is remote from the exhaust channel entrance.

3. The assembly of claim 2 wherein the exhaust channel has a deflector at the discharge end.

4. The assembly of claim 1 wherein the exhaust channel has a door.

5. The assembly of claim 1 further comprising a conveyor adjacent the exhaust channel and having a removable cover.

6. A chopping assembly for a farm implement, comprising:
   a corn head mounted to a frame;
   a housing mounted to the corn head and having an input port and an output port;
   a blade assembly disposed at least partially within the housing;
   an exhaust channel adjacent the output port of the housing;
   an adjustable shear plate mounted to the exhaust channel adjacent the output port; and
   wherein walls of the exhaust channel are tapered such that a cross section of the exhaust channel increases as material moves toward a discharge end wherein the discharge end is remote from the output port of the housing.

7. The assembly of claim 6 wherein the exhaust channel has a door.

8. The assembly of claim 6 wherein the exhaust channel has a deflector at the discharge end.

9. The assembly of claim 6 further comprising a conveyor adjacent the exhaust channel and having a removable cover.

\* \* \* \* \*